United States Patent [19]

Campanella et al.

[11] 3,894,200

[45] July 8, 1975

[54] ADAPTIVE ECHO CANCELLER WITH DIGITAL CENTER CLIPPING

[75] Inventors: Samuel J. Campanella, Gaithersburg; G. Suyderhoud, Potomac; Michael Onufry, Jr., Gaithersburg; Eric R. Kauffman, Walkersville, all of Md.

[73] Assignee: Communications Satellite Corporation, Washington, D.C.

[22] Filed: Oct. 10, 1973

[21] Appl. No.: 405,209

[52] U.S. Cl. ........................... 179/170.2; 179/170.6

[51] Int. Cl. ............................................ H04b 3/20

[58] Field of Search ........... 179/170.2, 170.6, 170.8

[56] References Cited

UNITED STATES PATENTS

| | | | |
|---|---|---|---|
| 3,585,311 | 6/1971 | Berkley et al. | 179/170.6 |
| 3,699,271 | 10/1972 | Berkley et al. | 179/170.6 |
| 3,789,165 | 1/1974 | Campanella et al. | 179/170.2 |

*Primary Examiner*—Kathleen H. Claffy
*Assistant Examiner*—Randall P. Myers
*Attorney, Agent, or Firm*—Sughrue, Rothwell, Mion, Zinn & Macpeak

[57] ABSTRACT

In an echo canceller having a digital transversal filter and an adaptive control loop, minimum echo is obtained by subtracting a synthesized echo from the real echo, the synthesized echo being formed in the digital transversal filter by multiplying a stored replica of the impulse response times the incoming signal. The stored replica is updated using the steepest descent technique by adjusting each of the stages of the replica memory a given amount. Adjustment is made when the echo and the sampled incoming signal are above respective threshold levels. The number of bits required to quantize the contents of the replica memory is reduced by means of digital center clipping. This is accomplished by making a fixed number of the lowest order bits of the error signal equal to zero before digital-to-analog conversion whenever speech from the far end, which may result in echo, is present. This process is inhibited whenever double talk exists in order to avoid distortion of desired speech.

4 Claims, 6 Drawing Figures

ADAPTIVE ECHO CANCELLER WITH DIGITAL CENTER CLIPPING

BACKGROUND OF THE INVENTION

1. Field of the Invention

This invention relates generally to the field of long-distance telephone communication systems, and more particularly to an improved and more economical echo canceller for use in such communication systems.

2. Description of the Prior Art

The two directions of transmission for long-distance communications are carried over physically separated cable pairs. This separation of direction is called four-wire transmission. A commercial telephone instrument transmits and receives over the same pair of wires. Although such two-wire transmission is entirely satisfactory for local telephone calls, in the case of long-distance connections it is necessary to convert from two-wire transmission to four-wire transmission. This is accomplished by a hybrid transformer circuit, and, to prevent energy from the receive path direction from entering the send path, the balancing net impedance and the impedance seen on the telephone or two wire side of the hybrid circuit must be very closely matched. The latter, however, varies from one telephone connection to another due to variation in the distance to the hybrid circuit. Thus, a compromise net impedance can realize an average of only about 12dB separation with a standard deviation of 3dB between receive and transmit sides.

Very long distance telephone communication, even with modern microwave transmission, requires substantial time for transmission, and, because of the non-ideal separation of transmit and receive side signals by the hybrid transformer circuit, echo is an undesirable phenomenon and a problem in the systems. In order to overcome this problem, echo suppressors are commonly used. One class of such echo suppressors operate to interrupt the send line whenever a voice level signal is detected on the receive line. This will eliminate echo but will also eliminate voice signals emanating from the local two-wire circuit and therefore clip the outgoing conversation. A double-talk detector is conventionally used to reduce interruption of the send line, normally caused by voice signals on the receive line, when voice signals are simultaneously emanating from both receive and send sides of the circuits, i.e., speakers at both ends are talking simultaneously. However, if the speaker at the local 2-wire circuit is speaking softly relative to the speaker at the far end, the larger voice signal on the receive line may prevent operation of double talk detector and, thus the send line will be interrupted thereby clipping the speech on the send line. When the double-talk detector does operate correctly, the echo will not be prevented during double-talk, but will be transmitted along with the near talker speech.

Even when optimized, echo suppressors can often be unsatisfactory, and a different approach to the problem has been provided in a newer class of devices known as echo cancellers. An echo canceller does not interrupt the send line but generates an approximation, $\hat{y}(t)$, of the echo $y(t)$, and subtracts the former from the signal appearing on the send line. The remaining signal on the send line during double-talk is $S(t) + \epsilon(t)$, where $S(t)$ is the local voice signal and $\epsilon(t)$ is the residual error caused by $\hat{y}(t)$ not being exactly equal to $y(t)$. Thus, to selectively remove the echo on the send path, it is necessary to have a reasonably close replica of the echo signal, which can then be subtracted from the send path signal without otherwise disturbing that path.

For each established connection, the echo path has an unknown transfer function $H(f)$ with an impulse response $$h(t) = \int_{-\infty}^{\infty} H(f)\, e^{j2\pi ft}\, df$$

Obtaining and storing an accurate estimate, $\hat{h}(t)$, of this impulse response in digital form makes it possible to construct a close echo signal replica, $\hat{y}(t)$, by digitally convolving the receive side signal, $x(t)$, with $\hat{h}(t)$ over a finite window. This is accomplished by using a recirculating shift register for storing and moving the receive-side signal samples, $x[(j-i)T]$, a recirculating storage shift register for the model echo path impulse response samples, $h(iT)$, a convolution processor, and an adaptive control loop for obtaining and updating the model echo path impulse response.

The X register stores the N most recent samples of the receive signal and recycles N+1 positions every sampling interval so that the oldest sample is dumped and a new sample stored. The H register recycles at the same rate. During each recirculating cycle, each of the N contents of the H register is multiplied with the corresponding samples in the X register, and the products are summed. The result is a single sample $\hat{Y}$ produced by the convolution processor. This sample is the most recent estimate of the real echo signal, Y.

The values of the impulse response samples stored in the H register are continuously computed to minimize the mean squared error between $y(t)$ and $\hat{y}(t)$. The computation circuitry includes an adaptive control loop, responsive to the residual error, $\epsilon(t)$, and the receive side signal $x(t)$, for producing a positive, 0, or negative correction to the value stored in the H register. After convergence, i.e., attainment of minimum error or echo, the contents of the H register represent, in digital form, the impulse response of the echo path. The time of conversion and amplitude of the residual echo, $\epsilon(t)$, are important characteristics of any canceller.

In order to minimize the residual error, the number of bits for quantizing the H register contents must be relatively large. However, the cost and complexity of the echo canceller is very much dependent on the number of bits used to quantize the H register, and a reduction in size of the H register would greatly reduce the complexity and cost of the echo canceller.

SUMMARY OF THE INVENTION

It is, therefore, an object of the present invention to provide an adaptive digital echo canceller for use in long-distance communication systems wherein the number of bits required to quantize the impulse response is reduced and, hence, the size of the H register used to store the approximation of the echo signal replica is reduced.

The foregoing and other objects of the invention are attained by providing in an adaptive digital echo canceller of the type described, a digital center clipper which acts to inhibit low level signals when a signal is only present on the receive side of the circuit but which is by-passed during double-talk or when a signal is present on the send side of the circuits. This is accomplished by making a fixed number of the lowest order bits of the error signal, $\epsilon(t)$, equal to 0 before digital-to-analog conversion whenever speech from the far end, which may result in echo, is present. This process is inhibited whenever double-talk exists in order to avoid distortion of wanted speech. Digital center clipping of the error signal offers a three-fold improvement in the prior art echo cancellers. First, the echo approximation $\hat{Y}$ need not be as accurately produced, thereby resulting in faster convergence. Second, when convergence is obtained, the resulting echo has completely disappeared and cannot be heard even on a circuit which has very low noise. Third, because a less accurate approximation is required, the number of bits required to quantize the H register can be reduced resulting in significant economy.

BRIEF DESCRIPTION OF THE DRAWINGS

The specific nature of the invention, as well as other objects, aspects, uses and advantages thereof, will clearly appear from the following description and from the accompanying drawings, in which.

DESCRIPTION OF THE PREFERRED EMBODIMENT

Figures 1, 2, 3, 4:
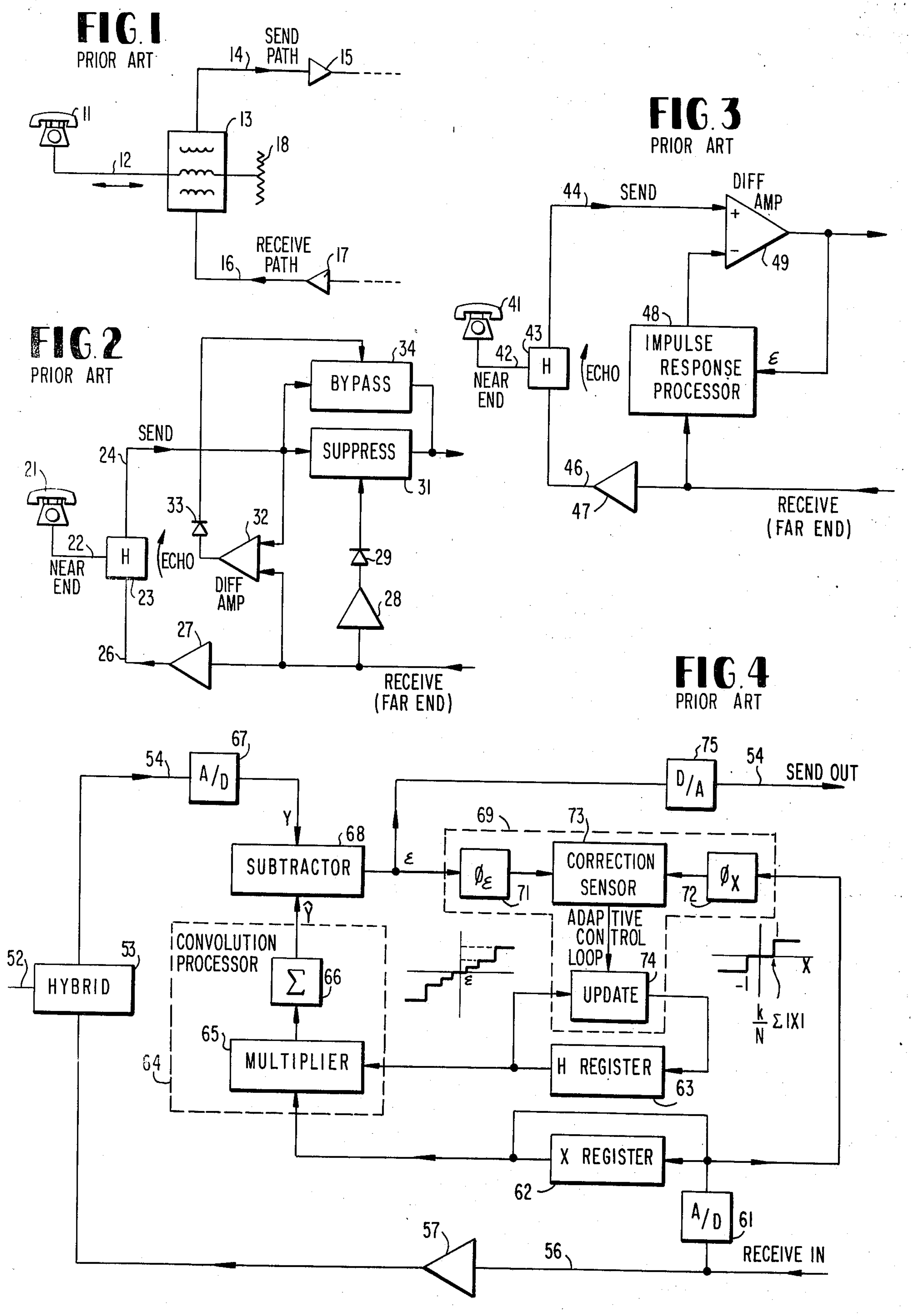
FIG. 1 PRIOR ART, FIG. 2 PRIOR ART, FIG. 3 PRIOR ART, FIG. 4 PRIOR ART
FIG. 1 illustrates a two-way, four-wire long-distance transmission path coupled to a two-way, two-wire transmission path by means of a hybrid transformer.
FIG. 2 illustrates the principle of the operation of an echo suppressor system in a two-way, four-wire long-distance transmission system.
FIG. 3 illustrates the principle of operation of an adaptive echo canceller system in a two-way, four-wire long-distance transmission system.
FIG. 4 is a detailed block diagram of a prior art digital adaptive echo canceller system.

In the typical long-distance telephone communication connection illustrated in FIG. 1, the subscriber's instrument 11 is connected by way of a two-way, two-wire transmission line 12 to the long-distance exchange. At the exchange, the two-wire transmission line is coupled to the usual two-way, four-wire long-distance transmission circuit by means of a hybrid transformer 13. One arm of the hybrid transformer is connected to the send path 14 with its associated amplifiers and repeaters symbolically represented by the amplifier 15, while another arm of the hybrid transformer 13 is connected to the receive path 16 and its amplifiers and repeaters symbolically represented by the amplifier 17. To prevent energy from the receive direction from entering the send path, the net impedence 18 and the impedence seen on the telephone side of the hybrid circuit 13 must be very closely matched. The impedence on a telephone side, however, varies from subscriber to subscriber due to the variation in distance to the hybrid circuit. Thus, only a compromise net impedence 18 can be realized with the inevitable result that some of the energy from the receive path will enter the send path producing echo.

FIG. 2 shows the principle of operation of an echo suppressor which is installed at a voice-frequency point in the four-wire connection. As before, the subscriber's instrument 21 is connected by a two-wire transmission line 22 to the hybrid circuit 23 at the long-distance exchange. The echo supressor includes a receive voice detector-amplifier 28 connected to the receive path 26 before the blocking amplifier 27. The output of voice detector-amplifier 28 is rectified by rectifier 29 and controls the insertion of a high loss in the transmit path 24 by means of a suppression circuit 31. If the party at the near end is talking at the same time as the party at the far end, this loss must be removed to avoid seizure of the circuit by one party. Hence, a differential amplifier 32 receives as its inputs, signals from both the receive and send side of the transmission circuit. The output of differential amplifier 32 is rectified by rectifier 33 and is utilized to control a by-pass circuit 34, which is connected in parallel with the suppression circuit 31. However, when the suppression circuit 31 is by-passed by the by-pass circuit 34, echo is transmitted in the send path. Even when optimized, this designed dichotomy can often by unsatisfactory, and a different approach to the problem may be realized with an echo canceller.

FIG. 3 shows the principle of operation of an adaptive echo canceller which is installed at a voice-frequency point in the four-wire connection. As before, the subscriber's instrument 41 is connected by a two-wire transmission line 42 and the hybrid circuit 43 to the send path 44 and the receive path 46 of a four-wire, long-distance transmission circuit. In this case, however, an impulse response processor 48 is connected to receive the receive signal prior to the blocking amplifier 47. The impulse response processor 48 constructs an echo signal replica which is subtracted from the signal on the send path 44 by differential amplifier 49. In order to minimize the error between the echo signal actually appearing on the send path 44 and the echo signal replica produced by the impulse response processor 48, the processor includes an adaptive control loop which receives as an input, the output differential amplifier 49. This output includes the residual error signal which is the difference between the echo signal and the echo signal replica.

The block diagram shown in FIG. 4 represents in greater detail, an adaptive digital canceller of the prior art type. The four-wire circuit comprising receive line 56 and send line 54 is connected to the two-wire circuit 52 by a hybrid circuit 53. An analog-to-digital converter 61 is connected to the receive line 56 before the blocking amplifier 57 and samples the incoming signal, $x(t)$, at the Nyquist rate and converts each sample into an n-bit digital word. An X memory register stores N samples of $x(t)$, $x_1$ through $x_N$, and recirculates once each sample period. The canceller also includes an H memory register 63 which stores N digital words, $h_1$ through $h_N$, wherein the position of $h_i$ corresponds to the position of $x_i$. The outputs of the X iregister 62 and the H register 63 are supplied to a convolution processor 64. This processor comprises a multiplier 65 receiving the outputs of the two registers 62 and 63 and a summation circuit 66 which sums the multiplier output over the sample period. The output of the summation circuit 66 is an approximation or quantized replica $\hat{Y}$ of the quantized echo Y.

The send line 54 is connected to an analog-to-digital circuit 67 which provides a quantized output Y of the echo signal. This output signal and the output of the convolution processor 64, $\hat{Y}$, are supplied to respective inputs of the subtractor circuit 68 to effect cancellation of the echo signal.

The H register 63 is initially $h_i = 0$ for $i = 1, 2, 3, \ldots N$. Digital convergence is provided by the adaptive control loop 69. The adaptive control loop 69 includes a residual error threshold circuit 71 for determining if $|\epsilon(t)|$ is above a minimum amplitude and for providing an output indicating the sign of $\epsilon(t)$ when $|\epsilon(t)|$ exceeds that threshold. A second threshold circuit 72 is provided for detecting if $|x_i|$ exceeds a threshold and for providing an indication of the sign of $x_i$ when that threshold is exceeded. Threshold detector 71 is connected to the output of subtractor 68, while threshold detector 72 is connected to the output of analog-to-digital converter 61. A correction sensor 73 receives the outputs of both the threshold detectors 71 and 72 and provides an output to the update adder 74 in the recirculation loop of H register 63.

During each recirculating cycle, the correction sensor 73 in the adaptive control loop 69 accepts an error signal, $\epsilon = Y-\hat{Y}$ and the $x[(j-i)T]$ samples from the X register 62 to produce a positive, 0, or negative correction to the value stored in the H register 63. This correction is executed by the update adder 74. The function performed by the correction sensor 73 may be represented by the product of the functions $\phi_x(x)$ and $\phi_\epsilon$ $(\epsilon)$, which are asymmetrical nondecreasing functions. The expression $\phi_x\phi_\epsilon$ actually represents N products, and each product results in a correction to one of the corresponding N values stored in the H register.

The canceller shown in FIG. 4 is completed by the connection of the output of subtractor 68 to digital-to-analog converter 75 which is in turn, connected to send line 54.

Figure 5:
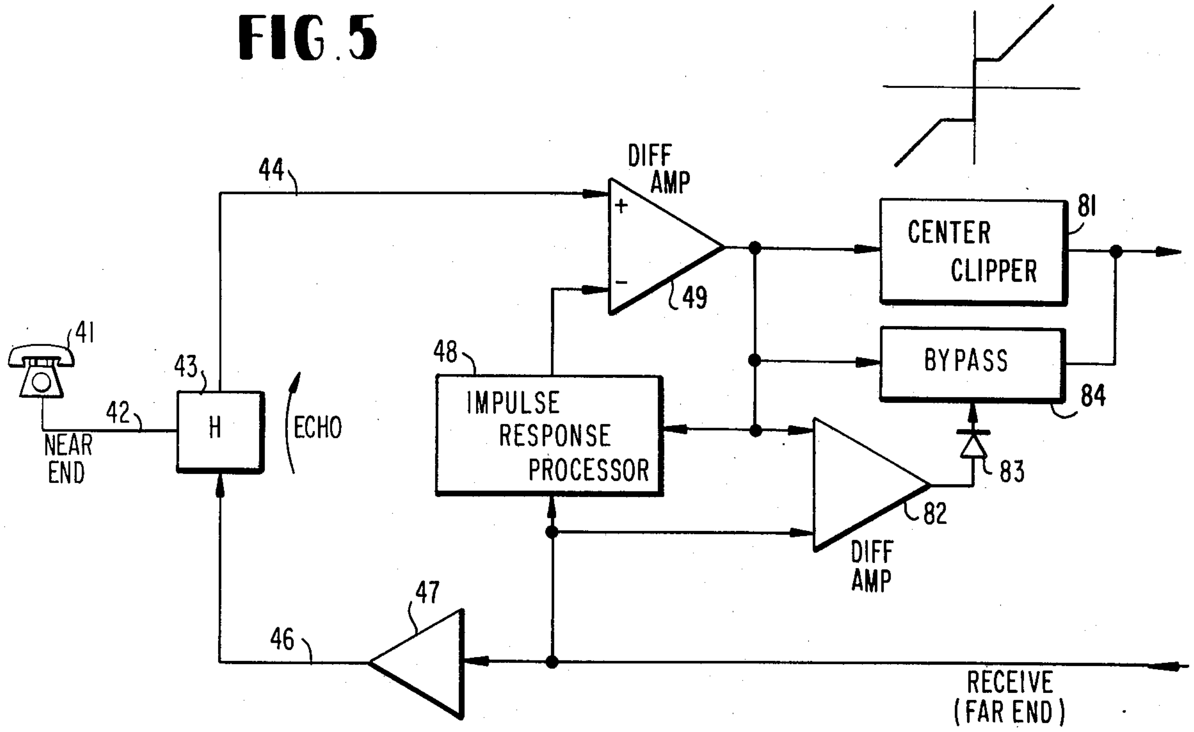
FIG. 5 illustrates the principle of operation of the improved echo canceller system of the present invention.

Referring now to FIG. 5 of the drawings, which is a modification of the illustration of FIG. 3 and wherein like reference numerals designate corresponding or like components, the principle of the operation of the improvement according to the invention will now be described. In order to obtain a small enough echo signal, $\epsilon(t)$, to render it unnoticeable, the number of bits N for quantizing the H register contents must meet a given criterion $N_0$. The cost and complexity of the canceller is very much dependent on this number $N_0$, and a reduction in $N_0$ reduces both, if it can be accomplished without sacrificing performance. The subject invention contemplates the reduction in the number $N_0$ with the attendant reduction in both cost and complexity; however, this necessarily means that the residual echo signal at the output of differential amplifier 49 will have a large enough amplitude to be noticeable to a far-end talker during far-end speech.

Since the residual echo signal at the output of amplifier 49 is a relatively low amplitude signal, the output of amplifier 49 is connected to a center clipper 81. Center clipper 81 is basically a low amplitude switch having a current transfer function of the type graphically illustrated just above the block representing the center clipper. In order to avoid distortion of near-end speech, a differential amplifier 82 with inputs from both receive and send sides is utilized to control, through rectifier 83, a by-pass 84 of the center clipper 81. As may be appreciated, this operation is somewhat analagous to the operation of the echo suppressor described with respect to FIG. 2. The difference, however, is that the output of differential amplifier 49 contains only a very low level residual echo signal, and it is only necessary for the center clipper 81 to attenuate this low amplitude signal. Higher amplitude signals are passed by center clipper 81 without attentuation. During double-talk, the low level residual echo signal from differential amplifier 49 is not perceptible at the far end and, therefore, the by-pass 84 passes the entire output signal from differential amplifier 49 without any attenuation.

Figure 6:
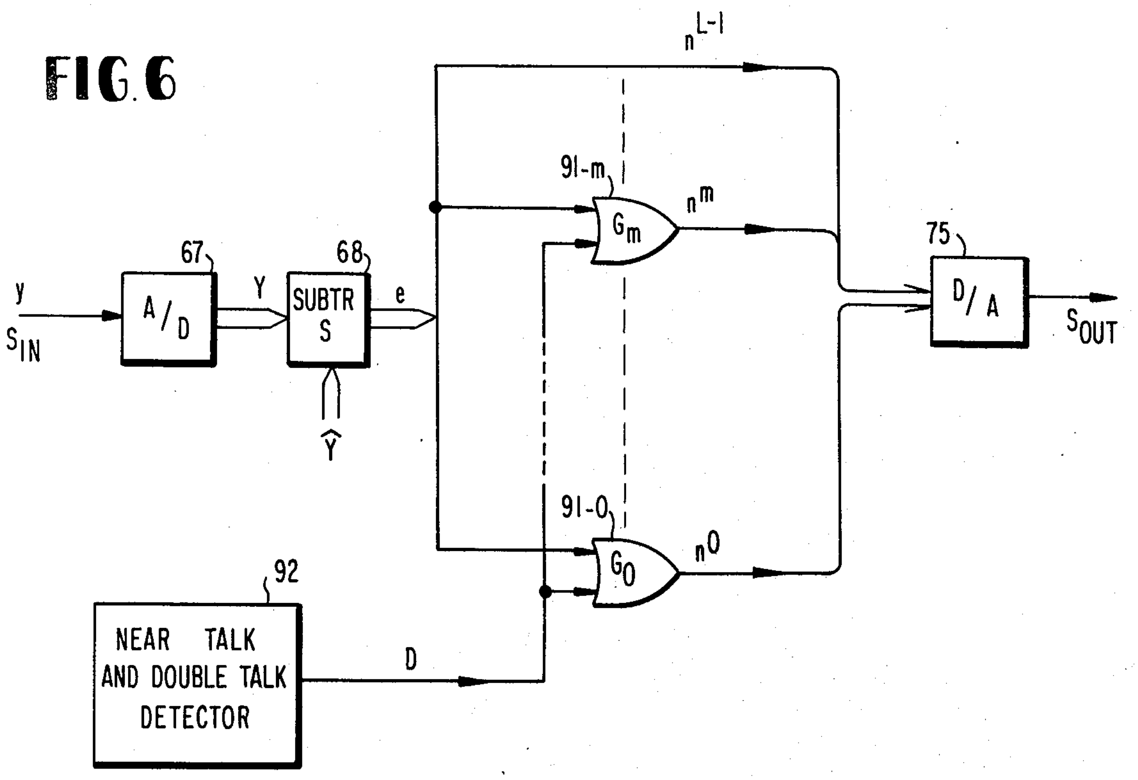
FIG. 6 is a detailed block and logic diagram of the digital center clipper used in the preferred embodiment of the invention.

The principle of operation explained generally in connection with FIG. 5 is accomplished in an echo canceller of the type shown in FIG. 4 by modifying the latter device to make a fixed number of lowest order bits of the error signal, $\epsilon(t)$, equal to 0 before digital-to-analog conversion whenever speech from the far-end, which may result in echo, is present. The process, as explained with respect to FIG. 5, is omitted whenever double-talk intervals exist to avoid distortion of wanted speech during such intervals. Implementation of the invention is shown in FIG. 6 which represents a modification of the digital adaptive canceller of FIG. 4 and wherein like reference numerals represent corresponding or like components. In FIG. 6, the digital center clipper is represented by a series of AND gates 91-0 to 91-M. Assume for the moment that 12 bits represents the digital word to be transmitted. Then, for example, there might be eight AND gates 91 corresponding on a one-to-one basis with the eight lowest order bits in the digital work. The bits representing the error signal from subtractor 68 which are ready to be fed to the digital-to-analog converter 75 are designated $n^0$ through $n^{L-1}$, with the 0 designating the least significant bit, 1 the next-to-least significant bit, etc. Those bits $n^0 \ldots n^m$ affected by the process of center clipping are gated through the AND gates 91-0 to 91-M, where M is less than or equal to L. These gates are disabled unless near-end speech is present which is detected by the near talk and double-talk detector 92. Detector 92 performs the analogous function of the differential amplifier 82 and rectifier 83 shown in FIG. 5. The output detector 92 is a logic 1 which enables the gates 91-0 to 91-M thereby passing all of the bits in the digital word to be transmitted to the digital-to-analog converter 75.

The advantage, when far-end speech is present only, is three fold. First, the echo signal replica Y need not be as accurately produced as would be otherwise by the model impulse response which is being built-up in the H register in order to reduce the echo signal. This, effectively, results in faster conversions. Secondly, whenever conversion is obtained, the resulting echo has completely disappeared and cannot be heard even on a circuit which has very low noise. Thirdly, because a less accurate impulse response model is required the H register quantiziation can be accomplished with lower number bits, thus considerably reducing the cost of the canceller.

It will be apparent that the embodiment shown is only exemplary and that various modifications can be made in construction and arrangement within the scope of the invention as defined on the appended claims.

What is claimed is:

1. In an echo canceller of the type having an impulse response processing means including computation means for performing convolution of an input signal on a receive line and a replica signal of the impulse response of an echo path to generate an approximation of an echo signal for subtraction from a rear echo signal on a send line, means for subtracting said approximated echo signal generated by said computation means from said real echo signal to generate a residual echo signal; and an adaptive control loop responsive to the residual echo signal resulting from said subtraction and to stored samples of said input signal for incrementally varying said replica signal to reduce said residual echo signal, said processing means further including means to store a plurality of samples of said input signal and for replacing the oldest sample with each new sample, and means to store said incremented replica signal, the improvement comprising:

a. low level amplitude clipping means connected to said send line for passing all signals except those having amplitude levels in the range of said residual echo signal,
b. near-speech and double-talk detection means connected to said subtracting means and to said receive line and,
c. by-pass means actuated by said detection means to by-pass said clipping means.

2. In an echo canceller as recited in claim 1 wherein said canceller is a digital canceller and the result of said subtraction is a digital word having L bits, said clipping means comprising a plurality of AND gates equal to or less than L connected to receive the lowest order bits of said digital word, said AND gates being gated open by the output of said detection means.

3. An echo canceller for reducing echos on the send line of a four-wire telephone communication system caused by signals received on the receive line of said four-wire system, comprising:

a. means for periodically sampling the signals on said receive line,
b. sample storage means for storing the latest N of said samples,
c. replica storage means for storing a replica signal of the impulse response of an echo path,
d. means for multiplying and summing, during each sample period, the contents of said sample storage means and said replica storage means to compute an approximated echo signal,
e. subtraction means for subtracting said approximated echo signal from a real echo signal on said send line to produce a residual echo signal,
f. an adaptive control loop responsive to said residual echo signal and to the sampled signals on line receive side for incrementally varying the contents of said replica storage means to reduce said residual echo signal,
g. clipping means connected to the output of said subtraction means for inhibiting the transmission of said residual echo signal,
h. near-speech and double-talk detection means connected to said subtracting means and to said receive line, and
I. by-pass means actuated by said detection means to by-pass said clipping means.

4. An echo canceller as recited in claim 3 wherein the output of said subtraction means is a digital word having L bits, said clipping means comprising a plurality of AND gates equal to or less than L connected to receive the lowest order bits of said digital word, said AND gates being gated open by the output of said detection means.

* * * * *

UNITED STATES PATENT OFFICE
CERTIFICATE OF CORRECTION

PATENT NO. : 3,894,200

DATED : July 8, 1975

INVENTOR(S) : Samuel J. Campanella, G. Suyderhoud, Michael Onufry, Jr., and Eric R. Kauffman It is certified that error appears in the above-identified patent and that said Letters Patent are hereby corrected as shown below:

IN THE HEADING:

Correct second Inventor's name to read -- Henri G. Suyderhoud --.

IN THE SPECIFICATION:

Column 1, line 53 - before "double" insert -- the --.
Column 2, line 8 - "x" should be -- ∞ --, and "-x" should be -- -∞ --.
Column 3, lines 57 - 58 - "impedence" should be -- impedance --.
line 58 - "impedence" should be -- impedance --.
line 59 - " impedence" should be -- impedance --.
line 63 - "impedence" should be -- impedance --.

Column 4, line 39 - after "output" insert -- of --.
line 57 - delete "iregister" and insert -- register --.

Column 5, line 34 - before "send" insert -- the --.

Column 6, line 45 - delete "Y" and insert -- $\hat{Y}$ --.
line 54 - delete "quantiziation" and insert -- quantization --.

IN THE CLAIMS:

Column 7, line 29 - delete "echos" and insert -- echoes --.

Column 8, line 14 - delete "line" and insert -- said --.
line 15 - delete "side" and insert -- line --.
line 24 - delete "I" and insert -- i --.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*